United States Patent

Formo

[15] 3,652,368

[45] Mar. 28, 1972

[54] APPARATUS FOR ROTATIONAL MOLDING OF LAMINATED HOLLOW STRUCTURES

[72] Inventor: Jerome L. Formo, Saint Paul, Minn.

[73] Assignee: Plastics, Inc., Saint Paul, Minn.

[22] Filed: Dec. 17, 1969

[21] Appl. No.: 885,911

[52] U.S. Cl. ............................... 156/501, 156/74, 156/582, 264/311
[51] Int. Cl. ........................................................ B32b 31/16
[58] Field of Search .................... 156/74, 501, 582; 264/311, 264/114, 270; 18/26

[56] References Cited

UNITED STATES PATENTS

| | | | |
|---|---|---|---|
| 3,341,896 | 9/1967 | Barnett et al. | 264/311 X |
| 3,232,812 | 2/1966 | Lorentz et al. | 156/582 X |
| 3,309,439 | 3/1967 | Nonweiler | 264/311 X |

Primary Examiner—Samuel W. Engle
Assistant Examiner—G. E. Montone
Attorney—Wicks and Nemer

[57] ABSTRACT

Apparatus for rotational molding of laminated hollow structures from plastic material is disclosed. A first plastic material is rotationally molded to the inside surface of a hollow mold until the first plastic material is in a fused condition. A second plastic material is then released from a thermally insulated container, which may be positioned within the mold and rotated with the mold, by air pressure moving an air piston attached to a cover of the insulated container to separate the cover from the insulated container. A bond is formed between the first and second plastic materials while the second plastic material is rotationally molded to the inside surface of the first plastic material to thus laminate the two materials together. After both materials are molded, the mold is cooled, rotation of the mold is stopped, and the molded structure is removed from the mold.

4 Claims, 5 Drawing Figures

PATENTED MAR 28 1972 3,652,368

INVENTOR.
JEROME L. FORMO
BY
*Wicks & Nemer*
ATTORNEYS

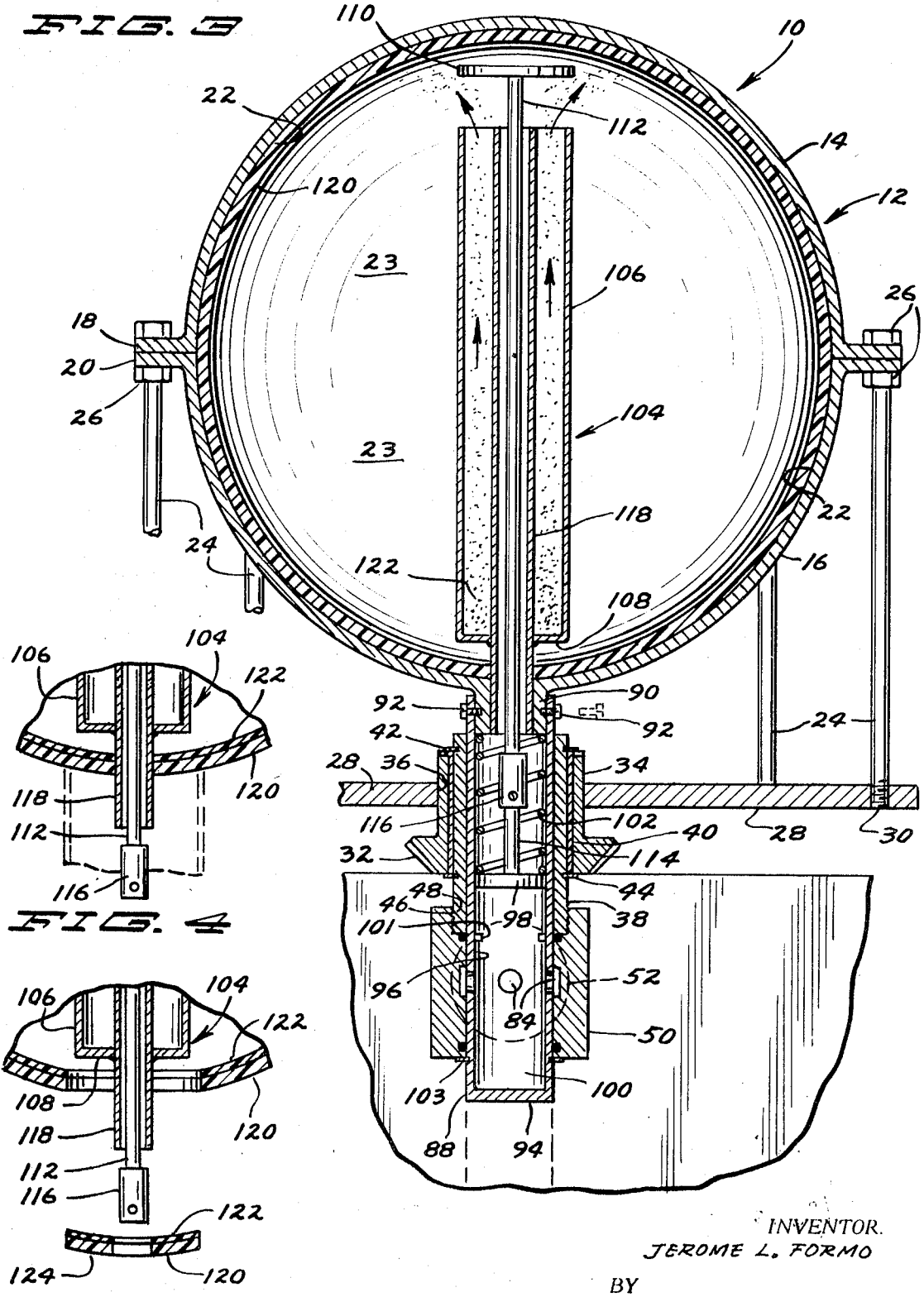

APPARATUS FOR ROTATIONAL MOLDING OF LAMINATED HOLLOW STRUCTURES

BACKGROUND

The present invention deals with hollow, rotationally molded, plastic structures, more particularly with a novel method and apparatus for making such structures, and specifically with a novel method, and apparatus performing according to that method, for rotationally molding laminated hollow structures from at least two plastic materials.

Plastic has proven a useful material for containers of liquid, for example gasoline tanks, and rotational molding has been found to be an effective method of manufacturing such containers. If a gasoline tank is rotationally molded from a relatively inexpensive plastic such as polyethylene and the tank is clamped in position, the combination of the pressure and chemical action of the gasoline on the polyethylene may cause stress cracking of the tank. A nylon tank may be used since the action of gasoline on nylon does not result in stress cracking, but nylon is relatively expensive. An entire tank of nylon is not necessary and in addition is not practical from a cost standpoint. A less expensive but entirely suitable tank would have an inside surface of nylon to avoid stress cracking and chemical reactions and an outside surface of polyethylene for support.

In the past, however, difficulties have been encountered in bonding two plastic materials together in a rotational mold such as to form an inside surface of one material and an outside surface of the other material. The present invention provides a method of so bonding two plastic materials and apparatus performing according to that method.

SUMMARY

Briefly, a preferred embodiment of apparatus operating according to the method of the present invention includes rotational molding apparatus for simultaneously rotating a heated hollow mold upon two axes. The mold itself consists of two halves which are joined for molding and may be separated to remove the molded structure. A first plastic material is added to the interior of the mold, the mold is joined, rotated, and heated, and the first material is molded to the inside of the hollow mold.

An insulated container is supported within the hollow mold so as to negligibly affect the molding process and so as to hold a second plastic material in a thermally insulated state from the first material. The second plastic material is preferably added to the insulated container at the same time the first plastic material is added to the interior of the mold, before the mold halves are joined. The insulated container includes a cover which may be separated from the insulated container by the application of fluid pressure upon the face of a piston attached to the cover of the insulated container. Upon the application of fluid pressure, the cover separates from the insulated container and the second plastic material is allowed to enter the interior of the hollow mold.

As the second plastic material comes into contact with the first plastic material maintained in a fused state, heat from the first plastic material and the interior of the mold brings the second plastic material to the fusion state also. The second plastic material is molded to the inside surface of the first plastic material by additional rotation and by mold heating. The mold is then cooled, and a bond is formed between the first and second plastic materials by virtue of the first and second plastic materials cooling through their melting points together. The bond between the first and second plastic materials produces an integral hollow laminated plastic structure according to the mold configuration. When the mold has properly cooled, the halves of the mold are separated, and the molded structure removed.

It is therefore an object of the present invention to provide a method and apparatus performing according to that method for rotationally molding hollow laminated plastic structures.

This and further objects and advantages of the present invention will become clearer in the light of the following detailed description of an illustrative embodiment of this invention described in connection with the drawings.

DESCRIPTION OF THE DRAWINGS

FIG. 3 is a sectional view of the apparatus of FIG. 2 along the section line 3—3 of FIG. 2.

FIGS. 4 and 5 are fragmentary sectional views illustrating one aspect of the removal of the molded plastic structure from the mold.

Figure 1:
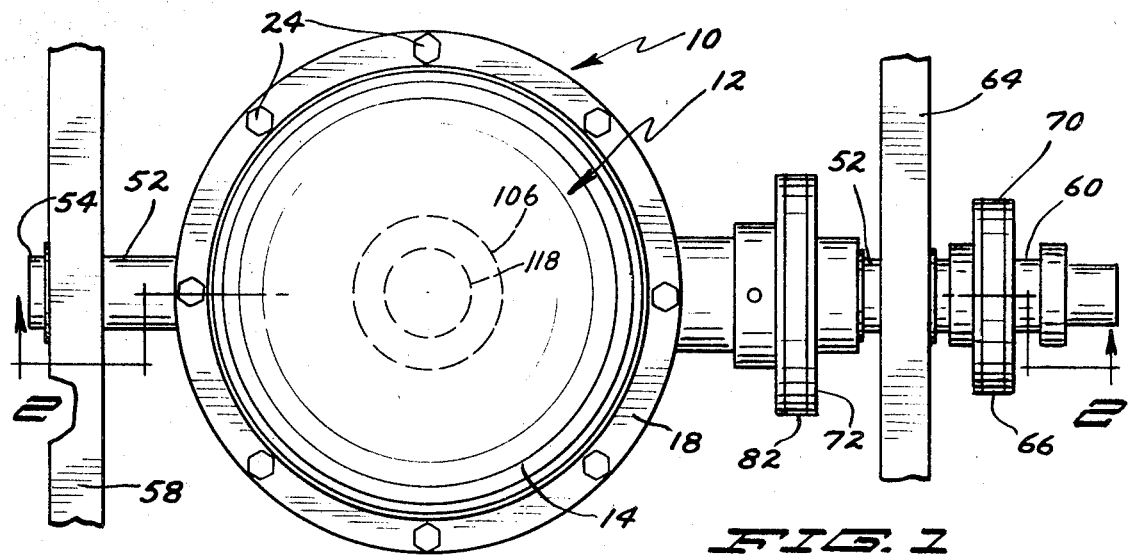
FIG. 1 shows a top plan view of molding apparatus capable of simultaneous rotational movement about two axes 90° separated from one another which molding apparatus operates according to the method of the present invention.

Where used in the various figures of the drawings, the same numerals designate the same or similar parts. Furthermore, when the terms "right," "left," "top," and "bottom" are used herein, it should be understood that these terms have reference only to the structure shown in the drawings as it would appear to a person viewing the drawings and are utilized only to facilitate describing the invention.

DESCRIPTION

In the figures, rotatable molding apparatus generally designated as 10 is shown. Molding apparatus 10 includes a hollow mold 12 having top and bottom semi-spherical halves 14 and 16, respectively, which are joined together by annular flanges 18 and 20. Flange 18 is joined with the semi-spherical mold top 14 around the circumference of mold top 14, and lies in a plane of the major diameter of semi-spherical mold top 14 extending outwardly from the center of mold top 14. Flange 20 is similarly joined to mold bottom 16. The halves of mold 12 may be assembled to present a spherical inside molding surface 22 to plastic material which inside surface encloses an internal chamber 23. The halves of mold 12 are assembled by a plurality of bolts 24 passing downward through holes formed around and through flange 18 and through underlying aligned holes formed around and through flange 20 and by a plurality of nuts 26 secured to bolts 24 above flange 18 and beneath flange 20. Bolts 24 also fix mold 12 to a horizontally arranged platform 28. In particular, bolts 24 have threads formed on their lower ends 30 which threaded ends are received within suitably threaded apertures formed within platform 28. Bolts 24 and platform 28 are together termed a cage in the rotational molding art because of their appearance.

The rotational movement of mold 12 is provided through platform 28. In particular, a first bevel gear 32 is integrally formed with a bottom end of a vertically arranged cylinder 34 functioning as a shaft. The top end of cylinder 34 passes through a central aperture 36 formed in platform 28, and cylinder 34 is attached to platform 28 by welding. Cylinder 34 and gear 32 are journalled upon a further vertically arranged cylinder 38 which has an outer diameter less than the inner diameter of cylinder 34 to admit bearing material 40 between cylinders 34 and 38.

The ends of cylinder 38 extend above and below the ends of cylinder 34, and retaining rings 42 and 44 are fitted within slots formed around the circumference of cylinder 38 immediately above and below the ends of cylinder 34 to provide stops and prevent vertical movement of cylinder 34 with respect to cylinder 38.

Cylinder 38 has threads formed on a bottom end 46, and end 46 is arranged to be received within a suitably threaded bore 48 formed in a central enlarge portion 50 of a horizontally arranged driveshaft 52. Shaft 52 has a left end 54 journalled in a bearing 56 positioned within a suitable support 58 and has a right end 60 journalled within a bearing 62 positioned within a suitable support 64.

A pulley 66 is fixed to shaft 52 by a pin 68 to cause pulley 66 to rotate with shaft 52. A belt 70 is arranged within pulley 66 and is further arranged to be driven by conventional drive means not shown so as to rotate pulley 66 and hence shaft 52 about a horizontal axis parallel to the plane of FIGS. 1 and 2 and at right angles to the plane of FIG. 3. The rotation of shaft 52 causes similar rotation of platform 28, bolts 24, and hence mold 12 since cylinder 38 which is fixed to the enlarged portion 50 of shaft 52 supports cylinder 34 which is fixed to platform 28.

Figure 2:
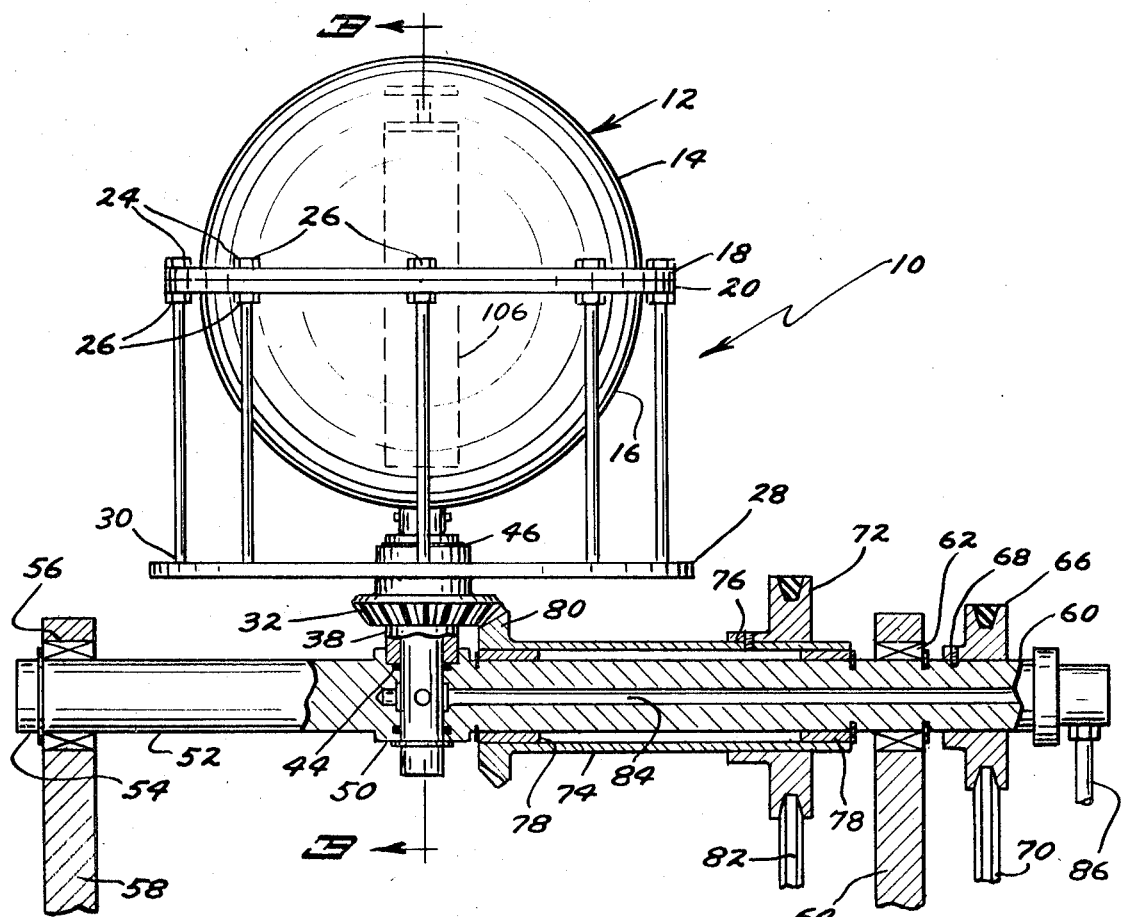
FIG. 2 is a side view of the molding apparatus of FIG. 1 with a portion thereof shown in section along section line 2—2 in FIG. 1.

Mold 12 is also rotatable about a vertical axis which axis is at right angles to the plane of FIG. 1 and parallel to the plane of FIGS. 2 and 3. In particular, a second pulley 72 is fixed to the right end of a cylinder 74 by a pin 76. Cylinder 74 is positioned around shaft 52 with the inner diameter of cylinder 74 greater than the outer diameter of shaft 52 such that bearing material 78 is received between cylinder 74 and shaft 52. A second bevel gear 80 is integrally formed upon the left end of cylinder 74 to engage bevel gear 32. That is, bevel gear 32 is arranged in a horizontal plane on cylinder 34 and bevel gear 80 is arranged in a vertical plane on cylinder 74 such that gears 32 and 80 are in meshing relationship. A belt 82 is arranged to be moved by conventional, means not shown, and to rotate pulley 72 around a horizontal axis. The rotation of pulley 72 causes the rotation of cylinder 74 and hence bevel gear 80 about a horizontal axis. The rotation of gear 80 rotates gear 32 and hence cylinder 34 and platform 28 around a vertical axis to thus rotate mold 12 about a vertical axis.

Shaft 52 further includes a bore 84 formed along its central longitudinal axis. The right end of bore 84 communicates with a hose 86 arranged to be connected to a source of fluid pressure. The left end of bore 84 communicates with a further vertically arranged cylinder 88. Cylinder 88 extends upward through enlarged portion 50 of shaft 52, within and beyond the top of vertically arranged cylinder 38. The top end of cylinder 88 is arranged to receive a downward extending neck portion 90 of lower portion 16 of mold 12. Neck portion 90 fits within the inner diameter of cylinder 88 and is fixed to cylinder 88 by a plurality of removable bolts 92, two of which are best shown in FIG. 3. The lower end of cylinder 88 is closed by an integrally formed end 94.

The inside of cylinder 88 forms an air cylinder 96 with cylinder 96 communicating with bore 84 of shaft 52. An air piston 98 is positioned within cylinder 96 for vertical reciprocal motion with respect to cylinder 88. The lower face of piston 98 and end wall 94 form a pneumatic chamber 100 with cylinder 96 which chamber receives the fluid pressure existing in bore 84 to control the movement of piston 98. Piston 98 is urged downward by a spring 102 having one end contacting neck 90 of mold 12 and the other end contacting the upper face of air piston 98. Spring 102 urges piston 98 downward until piston 98 is stopped by projecting stops 101 positioned in cylinder 88. Stops 103 are in the form of a retaining ring further used to maintain the position of cylinder 88 with respect to enlarged portion 50 of shaft 52. An additional retaining ring 103 is shown positioned in the outside of cylinder 88 below portion 50 of shaft 52 to further maintain the position of cylinder 88.

A container 104 formed of an insulating material such as a high temperature teflon is positioned substantially centrally of the interior 23 of mold 12. In particular, container 104 is formed of vertically arranged cylindrical side walls 106 and a horizontally arranged bottom end wall 108 integrally formed with side walls 106. A vertically and axially arranged disc-like cover 110 is arranged to coact with insulated container 104 in a first position for sealing the end of the insulated container 104 to prevent the contents of insulated container 104 from entering internal chamber 23 of mold 12. As shown, cover 110 is in a second or open position for allowing the contents of insulated container 104 to enter the interior chamber 23 of mold 12 at a preselected time with respect to the molding process, as will be explained.

The control of cover 110 is through the movement of piston 108 which is connected to cover 110 through a vertically arranged shaft 112, also of a thermally insulating material such as phenolic, connected to the lower face of cover 110 and a vertically arranged shaft 114 attached to the upper face of air piston 98. Shafts 112 and 114 are interconnected by an overfitting, removable, cylindrical, detent fastener 116. A movement of cover 110 from a first to a second position is thus caused by the movement of piston 98 from a first or closed to a second or open position within cylinder 98.

Shafts 112 and 114 move within a vertically arranged cylinder 118 mounted concentrically within and fixed to insulated container 104 about shaft 112. Cylinder 118 further passes downward through neck 90 of bottom half 16 of mold 12 to allow shaft 112 to exit from mold 12. Shaft 114 meets shaft 112 within the coils of spring 102, and detent 116 reciprocally moves within spring 102.

In FIG. 3, a first plastic material 120 is shown as molded to the inside surface 22 of mold 12 to form an outer layer of a hollow laminated structure and a second plastic material 122 is shown within insulated container 104.

OPERATION

In molding an article according to the preferred embodiment of the present invention, assume the rotation of the mold is stopped such that mold 12 is in a vertical position as is shown in the figures. The first plastic material 120, in the form of a powdered polyethylene plastic, is added to internal chamber 23 of mold 12. Fluid pressure is applied through hose 86, through bore 84, to pneumatic chamber 100, and thus to the lower face of piston 98. Piston 98 moves from its first position adjacent stop 101, against the action of spring 102, and to a second position determined by the level of air pressure applied.

Up to this point, the action of spring 102 has maintained cover 110 in a first position to coact with insulated container 104 and seal insulated container 104 to prevent the contents of that container from entering the interior chamber 23 of the mold. Upon the application of fluid pressure to piston 98, the piston and hence cover 110 moves with respect to container 104 from its first to its second or open position to thus allow access to the interior of insulated container 104. A second plastic material 122 such as powdered nylon is then added to the interior of insulated container 104, fluid pressure is removed, and cover 110 again coacts with insulated container 104 to seal it.

The mold is then sealed, placed in an oven (not shown) or otherwise heated, and rotated. Rotational drive means without the oven (not shown) are actuated to move belts 70 and 82 which belts in turn rotate pulleys 66 and 72 which are also maintained without oven unless heat resistant belts such as chain drives are used. The rotation of pulleys 66 and 72 rotate mold 12 about a vertical and about a horizontal axis to provide biaxial molding of plastic within the spherical mold. The rotational speed maintained is very slow, less than 20 revolutions per minute, such that the force upon the powdered polyethylene material is gravitational in nature and not centrifugal.

After a time, the heated mold transmits sufficient heat to the powdered polyethylene material to change it from a powdered state to a liquid state whereby the polyethylene material coats the inside surface 22 of mold 12, as is shown in FIG. 3. While the polyethylene is in this fused state, fluid pressure is applied to piston 98 to release the powdered nylon 122 from the interior of insulated container 104, as described.

Since the polyethylene is in a fused state, the heat stored within the polyethylene rapidly brings the powdered nylon to a fused state also. Thus, a layer of nylon is deposited over the inside surface of the polyethylene 120, and the nylon is rapidly brought to a fused state also.

It is to be noticed that the rotation and heating of the mold was not interrupted since the nylon was previously deposited in the insulated container 104. Note should also be made that the addition of the nylon to the interior 23 of mold 12 can be accomplished automatically after the process times have been determined by a simple timed control of the fluid pressure provided to hose 86. If not desired, the addition of the nylon from insulated container 104 may also be initiated manually by manually controlling the fluid pressure provided to hose 86.

After the nylon has reached a fused state and is properly molded, the mold is spray cooled with water to set the condition of the plastic while the mold is moved, the mold 12 is removed from the oven, and the mold 12 is fast cooled with a volume of water. At this point, the polyethylene and the nylon form an integral hollow laminated plastic structure at least since they have cooled through their melting points together.

To remove the molded article, nuts 26 are removed from bolts 24, and the top 14 of mold 12 is removed. Also, bolts 92 holding neck 90 of the bottom portion 16 of mold 12 to cylinder 88 are removed and the bottom one half 16 of mold 12 including the molded article can be removed from the rotational apparatus by removing shaft 112 and detent fastener 116 from shaft 114, as shown in FIG. 4. A plug of laminated plastic material 124 is then cut from the molded article, as shown in FIG. 5, and insulated container 104 is removed.

While the method and apparatus of the present invention apply for many combinations of similar and dissimilar materials, one valuable embodiment is a polyethylene outer layer and a nylon inner layer. A high density polyethylene (specific gravities of from 0.95 to 0.96) such as Dupont Alathon (trademark) types 7040 or 7140 or the high density polyethylene produced by Fusion Rubbermaid may be used for the first plastic material 120. Also, a medium density (specific gravity around 0.93) polyethylene such as microthene 715 or 711 produced by the United States Industrial Chemical Company may be used. Nylon 12 such as types L1600 and L1610 produced by Allied Chemical Company can be used for the nylon inner layer with good results. Also, types L1940 and N1901 also produced by Allied Chemical Company may be used. Nylon 6 produced by the J. P. Money Company or Micropel 6000 produced by Nypel Company may be used.

Using the above materials, the first and second plastic materials are placed in their respective positions in the mold in powdered form of 35 mesh. The mold is placed in the oven which oven is maintained at a temperature ranging between 525° and 640° Fahrenheit. During the time in the oven, the mold is rotated at a low speed of between six to 15 revolutions per minute. In order to properly mold the polyethylene and render it in a fused state, 11 to 17 minutes are needed of heating and rotation. A layer of polyethylene on the order of 80 to 100 mils may be formed during this time. Fluid pressure is applied to piston 98 to release the powdered nylon after the eleven to seventeen minute interval and an additional molding and heating time of 1 to 7½ minutes is required for the nylon to reach a fused molded state. A thin layer of 30 mils of nylon may be deposited in one minute while a relatively thick layer of 135 mils of nylon may be deposited in seven and a half minutes.

Thus, an integral laminated molded article formed from at least two plastic materials may be formed using the teachings of the present invention.

Now that the teachings of the present invention have been explained, many extensions and variations will be obvious to one skilled in the art. For example, while the preferred embodiment of the present invention has been explained with respect to specific materials, times, temperatures, thicknesses, and configurations, no restriction to these specified items is intended.

Further, the exact rotational speed of the mold will depend upon the size and configuration of the article to be molded. If the article to be molded does not have symmetry about all axes of rotation, such as the sphere illustrated, the rotational speed about the individual axes should be adjusted to control the speed of the flow of plastic materials across the mold surface to be equal about all axes.

Additionally, the preferred embodiment has been explained with respect to material in the powdered form using a biaxial molding process. No limitation to the powdered form or a two axis molding system is intended. One axis or three axes may be used, and material in liquid or powder form will function with the apparatus and method of the present invention.

Further, it is not necessary that insulated container 104 be inside of mold 12. The interior chamber 23 of mold 12 is the most appropriate and preferred position since it is desired to shield the second plastic material 122 contained within insulated container 104 from the heat to avoid fusion until the proper moment for its release and since the interior of mold 12 is the last place associated with mold 12 to be heated, i.e., it is the most shielded position. Insulated container 104 may be placed on the outside of mold 12 with proper provision for the entrance of the material 122 into the mold and with proper heat shielding.

Furthermore, while the configuration of insulated container 104 was shown as cylindrical, no limitation to this particular configuration is intended.

Still furthermore, the opening allowing the entrance of material from the insulated container may be in the side of the container rather than in the top. An example of this is where the insulated container comprises an inner and an outer container which may be rotated with respect to one another to align holes formed in both of them. In this case, the cover is the outer cylinder which prevents the material within the inner container from entering the interior of the mold in some circular orientations of the inner and outer cylinders, and allows the material within the inner container to enter the interior of the mold in other circular orientations.

Likewise, the means for moving the cover with respect to the insulated container may be an electrical solenoid, hydraulic means or other means rather than the fluid piston arrangement shown.

Similarly, in molding some articles, it may not be necessary to further heat the mold after the second plastic material 122 is released within the internal chamber 23. The heat stored in the first plastic material 120 in a fused state may be adequate to bring the second plastic material 122 to a fused state and properly mold it. This depends strongly on the thickness of the layer of the second plastic material 122 desired to be molded and integrally adhered to the inside surface of the first plastic material 120.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. In conjunction with apparatus for performing rotational molding by rotating and heating a plastic material around at least one axis of rotation, the apparatus including a mold, means for rotating the mold about the one axis, and means for heating the mold, improved apparatus for molding laminated hollow structures from plastic material, comprising in combination:
   a. insulated container means having a portion thereof open to the interior of the mold;
   b. cover means arranged to coact with the open portion of the insulated container means for sealing the insulated container means and preventing the contents of the insulated container means from entering the interior of the mold; and
   c. controlled actuating means connected to the cover means for moving the cover means with respect to the insulated container means for allowing the contents of the insulated container means to enter the interior of the mold at a preselected time with respect to the molding process, comprising:

aa. cylinder means adapted to be connected to a source of fluid under pressure;
bb. piston means connected to the cover means, the piston means arranged to be reciprocably movable within the cylinder means so as to assume a first position for causing the cover means to seal the insulated container means and prevent material within the insulated container means from entering the interior of the mold and to assume a second position for causing the cover means to be moved relative to the insulated container means for allowing material within the insulated container means to enter the interior of the mold;
cc. means for normally maintaining the piston means in the first position; and
dd. means for controlling a supply of fluid under pressure to the cylinder means, the introduction of the fluid under pressure overcoming the effect of means (cc) and causing the piston means to assume the second position to allow the entrance of material within the insulated container means into the interior of the mold.

2. The apparatus of claim 1, wherein means (cc) for normally maintaining the piston means in the first position comprises a spring.

3. The apparatus of claim 1, wherein:
aa. the insulated container means includes a connection passing through the mold and attaching to at least one of the means for rotating the mold, the connection being hollow and extending through the insulated container means;
bb. the cover means comprises a removable end of the insulated container means; and
cc. a shaft interconnects the removable end of the insulating container means with the piston, the shaft passing through the hollow portion of the insulating container means and the hollow portion of the connection means so as to avoid contact with the material within the insulating container means.

4. The apparatus of claim 3, wherein:
aa. the means for rotating the mold simultaneously rotates the mold on two axes substantially 90° rotated from each other; and
bb. the mold is symmetrical about each of the axes or rotation.

* * * * *